Feb. 16, 1965  I. SZLECHTER  3,169,370
APPARATUS AND METHOD FOR DEVELOPING
MECHANICAL POWER FROM A LIQUID
Filed Nov. 1, 1962  2 Sheets-Sheet 1
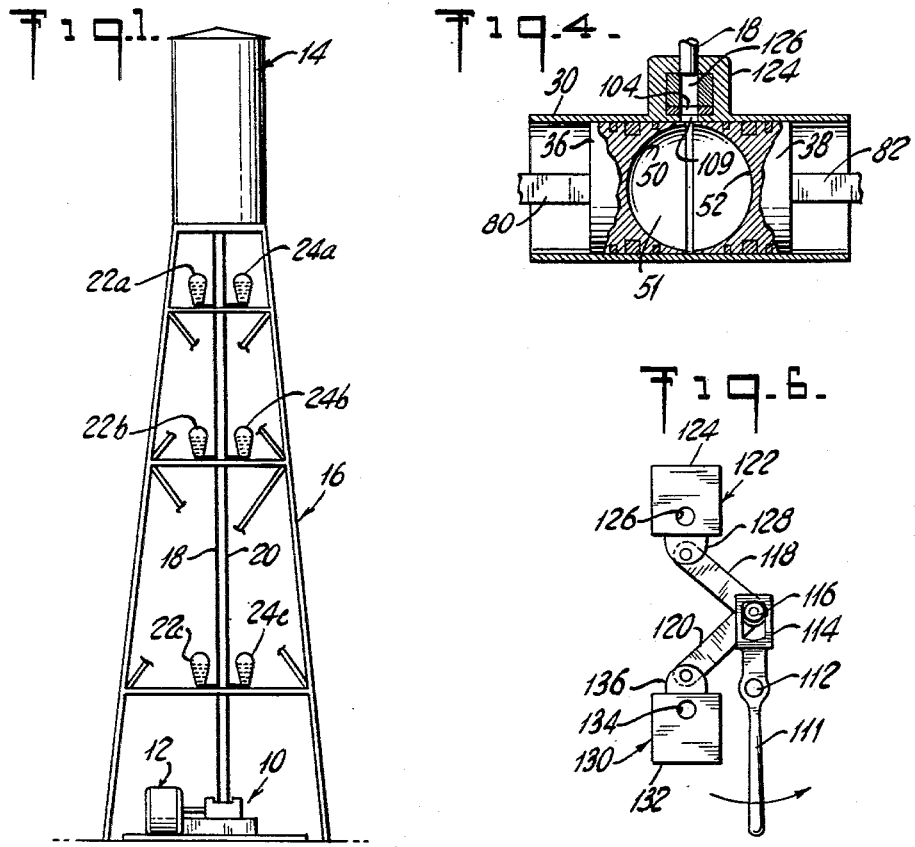
INVENTOR
ISAAC SZLECHTER
BY
Hopgood & Calimafde
ATTORNEYS Feb. 16, 1965
I. SZLECHTER
3,169,370
APPARATUS AND METHOD FOR DEVELOPING
MECHANICAL POWER FROM A LIQUID
Filed Nov. 1, 1962
2 Sheets-Sheet 2
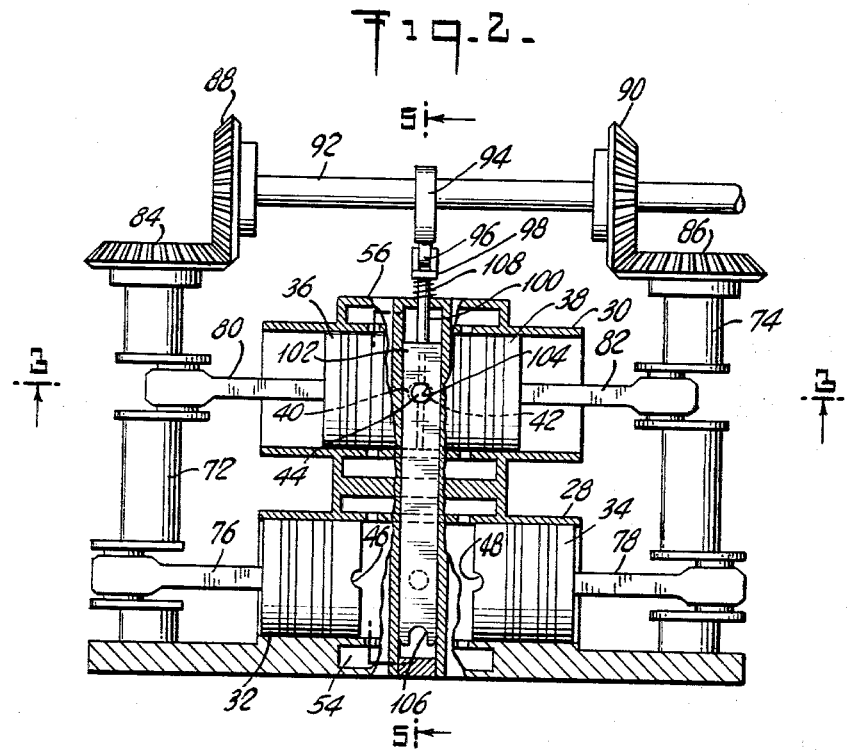
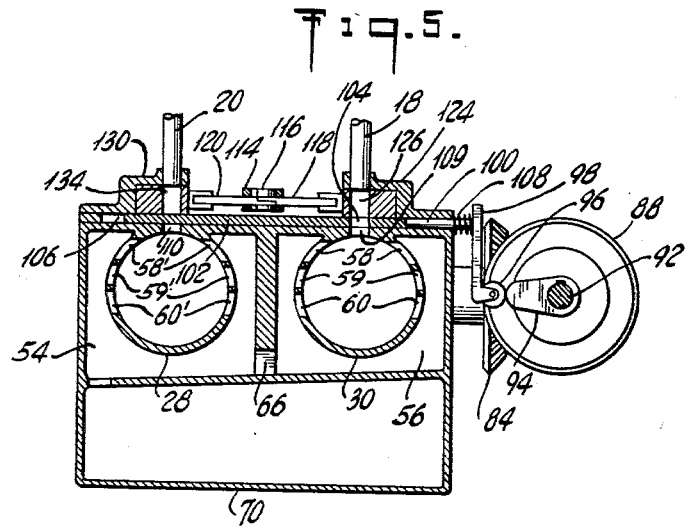
INVENTOR
ISAAC SZLECHTER
BY
Hopgood & Calimafde
ATTORNEYS

United States Patent Office 3,169,370
Patented Feb. 16, 1965

3,169,370
APPARATUS AND METHOD FOR DEVELOPING
MECHANICAL POWER FROM A LIQUID
Isaac Szlechter, 184 Lee Ave., Apt. 1C, Brooklyn, N.Y.
Filed Nov. 1, 1962, Ser. No. 234,796
3 Claims. (Cl. 60—51)

This invention relates to a method and apparatus for converting the potential energy of a liquid into a mechanical energy.

Various mechanical arrangements have been employed in the past to develop mechanical energy by the use of water. The better known methods for accomplishing this include the use of a water wheel whereby water is allowed to flow from a given upper level into buckets or the like of the wheel at a lower level to impart rotary motion to the wheel. These and other prior art arrangements have a number of disadvantages, among which are that the operating efficiency of the mechanism is very low. Additionally, the wheel or other mechanical apparatus which develops the power is ordinarily very large considering the amount of power that can be developed.

Accordingly, it is an object of this invention to provide a method and apparatus whereby the potential energy of a liquid is employed to produce mechanical power in an efficient manner compared with prior art techniques.

Another object of the invention is to reduce the size of the mechanical apparatus necessary to produce a given amount of power from the potential energy of a liquid.

All of the objects, features and advantages of this invention and the manner of attaining them will become more apparent and the invention itself will be best understood by reference to the following description of an embodiment of the invention taken in conjunction with the accompanying drawing, in which FIG. 1 is a view of a system for developing mechanical power including a hydromotor and a tower for supporting a water tank above the motor, FIG. 2 is a plan view partly in section of a hydromotor constructed in accordance with the invention, FIG. 3 is a sectional view from the front, of the motor of FIG. 2, taken along the line 3—3 thereof, FIG. 4 is a fragmentary view in cross section of the motor of FIG. 2 showing details of piston construction.

FIG. 5 is a sectional side view of the motor of FIG. 2, taken along line 5—5 thereof, and FIG. 6 is a view showing details of a speed control or throttle mechanism employed as a part of the motor of FIGS. 2–5.

Referring now to FIG. 1, there is shown a hydromotor 10 which may drive, for example, an electric generator 12 by means of potential energy of water in a tank 14 at the top of a tower 16. The water from the tank 14 is guided to the input of the hydromotor 10 by means of suitable vertical pipes 18 and 20. A series of expansion chambers 22a, 22b and 22c are connected to the pipe 18, and a series of expansion chambers 24a, 24b and 24c are connected to the pipe 20, the purpose of which will be later described.

Referring next to FIGS. 2, 3 and 5, the construction of the hydromotor includes a pair of cylinders 28 and 30. A pair of pistons 32 and 34, which are adapted to move in opposite directions from one another are provided in the cylinder 28. Likewise a pair of pistons 36 and 38 are provided in the other cylinder 30. The pistons 36 and 38 are each provided with semicircular cutout portions 40 and 42, respectively, which cooperate to form a generally circular port or aperture 44 when these pistons are in their innermost positions. Similarly, the pistons 32 and 34 are provided, respectively, with semicircular cutout portions 46 and 48, which also form a generally circular port when these pistons are in their innermost positions.

FIG. 4 shows the cylinder 30 and pistons 36 and 38 in cross section. From this figure it will be seen that the inner ends of the pistons 36 and 38 facing one another are provided with hemispherical or cup-shaped portions 50 and 52, respectively, for a purpose which will be presently described.

Referring again to FIGS. 2, 3 and 5, water jackets 54 and 56 are provided, respectively, about the cylinders 28 and 30. The cylinder 30 is provided with water outlets 58–60 and 61–63, see especially FIGS. 3 and 5. The first set of outlets 58–60 cooperate with piston 36 during operation, and the set 61–63 cooperate with piston 38, as will appear. A total of 6 outlets is associated with each piston to insure rapid flow of the fluid from the cylinder at the appropriate time during operation. These outlets communicate with the water jacket 56. A similar set of outlets 58'–63' is also provided in the cylinder wall 28 to communicate with the water jacket 54. Each of the water jackets 54 and 56 communicate with outlet openings 66 and 68, beneath which may be located a suitable liquid collecting tank or manifold 70. This tank includes an opening 71 to allow air from the atmosphere to enter the cylinders 30 and 28 through the water outlet ports 58 and 58', respectively, as water is exhausted therefrom during operation, as will appear.

The pistons 32 and 34 are mechanically connected, respectively, to crank shafts 72 and 74 by means of connecting rods 76 and 78. Likewise the pistons 36 and 38 are connected, respectively, to the crank shafts 72 and 74 by means of connecting rods 80 and 82. The crank shafts 72 and 74 include helical gears 84 and 86, respectively, which engage gears 88 and 90 on a shaft 92.

There is mounted on the shaft 92, a cam 94, as seen in FIGS. 2 and 5. A cam follower wheel 96 is positioned for engagement with the cam 94 and is carried by a member 98. A mechanical link 100 is employed for connecting the member 98 to a reciprocable valve control member or bar 102 for controlling flow of water into the cylinders 28 and 30. This reciprocable valve member 102 is provided with an aperture 104 at one end and a semicircular cutout portion 106 at the other end. This valve member 102 is spring loaded in a direction against the cam 94 by means of a spring 108 which is compressed between the housing of the water jacket 56 and the member 98. The aperture 104 communicates with an inlet port 109 in the wall of the cylinder 30, and also with the port 44 formed by the pistons 36 and 38. Similarly, the circular cutout portion 106 of the member 102 communicates with an inlet port 110 in the wall of the cylinder 28, and also with the apertures formed by the semicircular cutout portions 46 and 48 in the pistons 32 and 34.

FIG. 6 shows a throttle or speed control arrangement, portions of which are also seen in FIG. 5. This arrangement includes a lever 111 rotatable about a fulcrum 112. This lever 111 has at one end a slot 114 for receiving a member 116 engageable therewith. The member 116 is connected to one end of each of two connecting links 118 and 120. The other end of connecting link 118 is connected to a valve 122 at the bottom of the vertical pipe 18, of FIG. 1. This valve 122 includes a fixed portion 124 having an aperture 126 therein and a movable member 128 for regulating the amount of liquid that can pass through the aperture 126. In similar manner the connecting link 120 is connected to a valve 130 which comprises a fixed portion 132 having an aperture 134 therein, and a movable member 136.

The system of this invention operates in the following manner. With the throttle mechanism as shown in the open position of FIG. 6, and the pistons having the positions shown in FIG. 2, the member 102 will be in the open position with respect to the vertical pipe 18. Accordingly, the aperture 104 in the member 102 will overlie the port 109 in the wall of the cylinder 30, and also the aperture 44 formed by the pistons 36 and 38, so that the water pressure in the pipe 18 will drive these pistons outwardly. The water pressure against the piston surfaces 50 and 52 is, in accordance with Pascal's law, equal to the pressure in the pipe 18 and the amount of the pressure depends upon the height of the water in the tank 14.

As the pistons 36 and 38 progress outwardly, water will continue to flow from the pipe 18 into the space between the pistons 36 and 38 until the cam 94 has moved the reciprocable valve member 102 to a position where it closes the pipe 18 to the cylinder 30. For best design this will occur at a point just before the inner edges 138 and 140 of the cylinders 36 and 38, respectively, approach the positions 142 and 144, respectively, during their outward excursions, as seen in FIG. 3. As these edges 138 and 140 travel further outwardly, beyond the positions 142 and 144, water from the cylinder 30 will travel through the outlets 58–63 into the water jacket 56, through the outlets 66 and 68, and into the tank or manifold 70. Water will continue to flow out of the cylinder 30 as the pistons 36 and 38 continue in their outward movement, and also as they reverse their movement and travel inwardly from their outermost positions, back to the positions 142 and 144.

It will be seen that the lowermost outlets 60 and 63, are located some distance above the lowest point of the cylinder 30. This is to allow some water to remain in the cylinder and this water substantially fills the spherical space 51 when the cylinders 36 and 38 return to their innermost positions, as seen in FIG. 4. Some air, of course, exists in this space 51. However, ideally the pressure therein should be equal to the pressure of the water above the member 102 in the pipe 18.

As the pistons 36 and 38 again commence their outward movement, the cam 94 again allows the water to pass into the cylinder 30 through the aperture 104. The process continues repeatedly as described above.

It will be obvious that the pistons 32 and 34 in the cylinder 28 function in the same manner as that just described for the cylinders 36 and 38. The water which is fed to the cylinder 28 is, of course, regulated by the opening and closure of the end of the reciprocable valve member 102 having the curved cutout portion 106. As will also be understood, the action of the pistons in cylinder 28 is 180° out of phase with the action of the pistons in the cylinder 30.

The speed of the hydromotor may be precisely controlled by movement of the lever 111, see especially FIG. 6. Movement of the free end of the lever 111 in a counterclockwise direction about the fulcrum 112 will tend to close the valves 122 and 130, and movement in a clockwire direction will open the same.

Upon the reciprocating action of the cam actuated valve member 102, the pressure in the pipes 18 and 20 will undergo substantially rapid changes, causing substantial stresses therein. Provision is made for ameliorating the severity of these stresses by means of the expansion chambers 22a–c and 24 a–c of FIG. 1.

It will be appreciated that by means of this invention it is now possible to develop mechanical power from the potential energy of water, in a more efficient manner and by a motor mechanism which is much smaller than the equivalent machines employed heretofore for the same purpose. Furthermore, it will be seen that the motor mechanism of the invention is similar in some respects to steam and internal combustion engines, all being of the reciprocating piston type, and to the extent that they are similar, there is provided herein a new use for this known type of machine. Additionally, however, the motor mechanism herein does not operate with fluid in gaseous form, but rather in the form of liquid, with certain features being included in the mechanism to make it operate satisfactorily by means of liquid. It will be appreciated that other liquids besides water may provide the energy for operation of the motor. Also a liquid storage tank is not necessary as the liquid need merely be under pressure at the input of the cylinders and this can also be achieved by water from an ordinary water system.

While the foregoing description sets forth the principles of the invention in connection with specific apparatus, it is to be understood that the description is made only by way of example and not as a limitation thereof and in the accompanying claims.

What is claimed is:

1. A hydromotor for developing mechanical power from a liquid comprising
   a pair of cylinders,
   a pair of pistons in each of said cylinders axially aligned with one another,
   crankshaft means connected to said pistons so that said pistons in each of said cylinders are adapted for movement in opposite directions from one another, corresponding pistons in the different cylinders being operable out of phase with one another,
   the pistons in each cylinder having opposed faces which are generally cup-shaped so as to form a cavity between them when they are in their innermost positions,
   valve means operated by said crankshaft means to alternately feed said liquid under pressure to said cylinders into the regions between said pistons,
   a liquid outlet path in each of said cylinders, each path being maintained in a closed condition until the respective pistons have travelled a substantial distance from their top-dead-center positions at which time the respective paths are opened to allow some of said liquid to leave said cylinders,
   the liquid then remaining in said cylinders being substantially contained within said cavity when said pistons return to their top-dead-center positions,
   and a throttle for controlling the flow of liquid into said cylinders to vary the speed of said motor.

2. A hydromotor for developing mechanical power from water comprising
   a pair of cylinders,
   a piston in each of said cylinders,
   a crankshaft,
   connecting rods for mechanically connecting each of said pistons to said crankshaft so that said pistons are movable out of phase with one another,
   each of said pistons having a recess in the ends thereof opposite the ends associated with said connecting rods,
   valve means for controlling the flow of said water into said cylinders and recesses,
   cam means operated by said crankshaft for actuating said valve means to alternately feed said water into said cylinders,
   water outlet passages in each of said cylinders, said passages being maintained closed by said pistons until said pistons have travelled a substantial distance from their top-dead-center positions whereby they allow some of the water to leave said cylinders,
   the water then remaining in said cylinders being substantially contained within said recesses when said pistons return to their top-dead-center positions,
   and a throttle at the input of each of said cylinders for controlling the flow of water thereto to control the speed of said hydromotor.

3. A system for developing mechanical power from a liquid comprising
   a source of liquid under pressure, a motor adapted for connection to said liquid pressure source through an enclosed conduit,
said motor comprising a pair of cylinders,
a piston in each of said cylinders,
a crankshaft,
connecting rods for mechanically connecting each of said pistons to said crankshaft so that said pistons are movable out of phase with one another,
each of said pistons having a recess in the ends thereof opposite the ends associated with said connecting rods,
valve means for controlling the flow of said water into said cylinders and recesses,
cam means operated by said crankshaft for actuating said valve means to alternately feed said water into said cylinders,
water outlet passages in each of said cylinders, said passages being maintained closed by said pistons until said pistons have travelled a substantial distance from their top-dead-center positions whereby they allow some of the water to leave said cylinders,
the water then remaining in said cylinders being substantially contained within said recesses when said pistons return to their top-dead-center positions,
and a throttle at the input of each of said cylinders for controlling the flow of water thereto to control the speed of said motor.

References Cited by the Examiner

UNITED STATES PATENTS

| | | | |
|---|---|---|---|
| 255,312 | 3/82 | Maxim | 60—55 |
| 396,556 | 1/89 | Glazebrook | 60—52 X |
| 582,568 | 5/97 | Winter | 60—55 |
| 689,745 | 12/01 | Pratt | 91—184 X |
| 847,490 | 3/07 | Monroe | 91—186 X |
| 1,084,512 | 1/14 | Weikel | 91—411 X |
| 1,247,520 | 11/17 | Fessenden | 60—55 |
| 1,400,236 | 12/21 | Pfeffer | 91—325 X |
| 1,662,106 | 3/28 | Dorner | 123—32.2 |
| 1,678,309 | 7/28 | Swartwout | 91—184 X |
| 2,170,890 | 8/39 | Allen | 60—51 X |
| 2,568,528 | 9/51 | Welte | 60—52 X |
| 2,984,985 | 5/61 | MacMillin | 60—52 X |

FOREIGN PATENTS

| | | |
|---|---|---|
| 127,780 | 6/19 | Great Britain. |
| 348,603 | 5/31 | Great Britain. |

OTHER REFERENCES

"Gasoline Alley," Washington Post, September 7, 1930.

JULIUS E. WEST, *Primary Examiner.*
EDGAR W. GEOGHEGAN, *Examiner.*